United States Patent [19]
Fujioka

[11] Patent Number: 5,290,346
[45] Date of Patent: Mar. 1, 1994

[54] INK FOR PRINTER
[75] Inventor: Masaya Fujioka, Nagoya, Japan
[73] Assignee: Brother Kogyo Kabushiki Kaisha, Nagoya, Japan
[21] Appl. No.: 922,248
[22] Filed: Jul. 31, 1992
[30] Foreign Application Priority Data Aug. 28, 1991 [JP] Japan ................... 3-217390

[51] Int. Cl.$^5$ .................. C09D 11/02; C09D 11/12
[52] U.S. Cl. ......................... 106/21 A; 106/22 A; 106/22 B; 106/22 D; 106/31 R
[58] Field of Search ............... 106/21 R, 21 A, 22 A, 106/22 B, 22 D, 31 R

[56] References Cited

U.S. PATENT DOCUMENTS

| 3,389,011 | 6/1968 | Svensson | 106/22 A |
| 3,553,710 | 1/1971 | Lloyd | 106/22 B |
| 3,627,546 | 12/1971 | Coppeta | 106/21 A |
| 3,852,093 | 12/1974 | O'Leary | 503/202 |
| 4,162,164 | 7/1979 | Lin | 106/22 B |
| 4,171,982 | 10/1979 | Lin | 106/21 A |
| 4,188,139 | 2/1980 | Pasini et al. | 106/22 B |
| 4,336,323 | 6/1982 | Winslow | 106/22 B |
| 4,390,369 | 6/1983 | Merritt et al. | 106/20 R |
| 4,413,266 | 11/1983 | Aviram et al. | 106/22 B |
| 4,659,383 | 4/1987 | Lin et al. | 106/27 A |
| 4,818,742 | 4/1989 | Ellis | 503/201 |
| 4,822,418 | 4/1989 | Lin et al. | 106/22 R |
| 4,865,648 | 11/1989 | Kito et al. | 106/21 A |

FOREIGN PATENT DOCUMENTS 0099682  2/1984  European Pat. Off. .
1-198671  8/1989  Japan .

Primary Examiner—Helene Klemanski
Attorney, Agent, or Firm—Oliff & Berridge

[57] ABSTRACT

An ink for an ink jet printer capable of decoloring a recorded image or changing a color of the recorded image to thereby save resources, improve economy, and improve functionality. As a coloring composition of the ink, an organoboron salt of cyanine dye and an ammonium salt of organoboron are employed in combination. After printing, the recorded image is decolored by irradiating near infrared light emissions onto a recording surface of a recording paper. As a result, the recording paper can be reused.

14 Claims, 3 Drawing Sheets

INK FOR PRINTER

BACKGROUND OF THE INVENTION

1. Field of the Invention

The invention relates to an ink and, more particularly, to an ink for a printer.

2. Description of Related Art

An ink jet printer, which is one type of printer, has many advantages in printing technique such as it is noiseless and high-speed while providing high-quality and color printing. According to the principle of printing by such an ink jet printer, using an ink which is a liquid at ordinary temperatures, recording on a recording paper is performed by jetting liquid ink particles directly onto the recording paper. Accordingly, print quality and print drying time are influenced by the kind of recording paper. That is, if a low-quality recording paper is used, the print quality is remarkably reduced. As to such a liquid ink, Japanese Patent Application Laid-open No. Hei 1-198671 discloses a water color ink excellent in storage, image clearness, water resistance, and light resistance, and other many patent applications have been filed. However, the print quality in using the liquid ink is not satisfactory.

In general, it is known to use a hot-melt ink as a measure for solving this defect. A hot-melt ink, having a melting point higher than room temperature, is solidified with a uniform dot diameter on a recording paper irrespective of the kind of the recording paper. Therefore, printing can be performed with a high quality on any recording paper. As such a known hot-melt ink, there has been proposed an ink containing a natural wax, U.S. Pat. No. 4,390,369; an ink containing a stearic acid, European Patent Application Publication No. 0 099 682, and an ink containing an acid or alcohol of $C_{20}$–$C_{24}$ and further containing a ketone having a melting point higher than that of the acid or alcohol, U.S. Pat. No. 4,659,383. In these inks, a dye is used as a coloring matter.

Further, there has been disclosed in U.S. Pat. No. 4,659,383 and U.S. Pat. No. 4,822,418 a hot-melt ink containing a solid pigment dispersed in a wax, having a melting point higher than 65° C., or a fatty acid or alcohol of $C_{18}$–$C_{24}$.

However, in the conventional liquid ink and hot-melt ink for an ink jet printer, it is intended to merely consider permanence of color, age stability of ink characteristics, and print quality, and there is no consideration of ink composition regarding such functionality that the ink itself is capable of being decolored or changed in color. Thus, the printed matter to be produced by the printer is considered as a mere hard copy in the prior art.

SUMMARY OF THE INVENTION

It is accordingly an object of the invention to provide an ink for a printer which has a decoloring function or a color changing function, to thereby enable reuse of a printing paper or processing of a recorded image.

The ink for the printer according to the invention contains a coloring composition capable of being decolored or changed in color by the addition of external energy and a vehicle for retaining the coloring composition. The ink may be a hot-melt ink which is a solid at ordinary temperatures or a liquid ink which is a liquid at ordinary temperatures. The external energy is preferably a light energy, and the coloring composition is preferably composed of an organoboron salt of cyanine dye and an ammonium salt of organoboron.

The coloring composition according to the invention is retained by the vehicle or preferably dissolved in the vehicle and it is decolored or changed in color by the addition of external energy. The vehicle according to the present invention is solid or liquid at ordinary temperatures to retain the coloring composition.

As apparent from the above description, the ink of the invention is decolored or changed in color by the addition of external energy. Accordingly, a recorded image can be easily erased, or it can be differentiated from other images. Thus, the invention is greatly advantageous in saving of resources, improvement in economy, and improvement in functionality.

Other objects and features of the invention will be more fully understood from the following detailed description and appended claims when taken with the accompanying drawings.

DESCRIPTION OF THE PREFERRED EMBODIMENTS

There will now be described some preferred embodiments of the invention with reference to the drawings.

Figure 2:
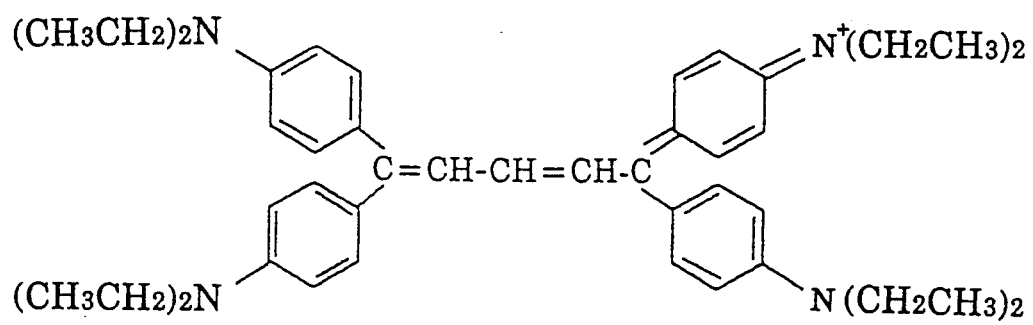
FIG. 2 is a formula representing a structure of an organoboron salt of cyanine dye as a part of a coloring composition according to the present invention.
Figure 2:
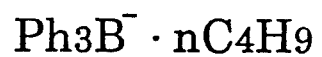

FIG. 2 represents the structure of an organoboron salt of cyanine dye as a part of the coloring composition according to the invention. The cyanine dye is blue and has an absorption maximum at 825 nm. When the cyanine dye is dissolved with an ammonium salt of organoboron (e.g., tetrabutylammonium butyltriphenyl borate) in a solution, the cyanine dye has a property that it absorbs near infrared emissions and loses its color.

In a first preferred embodiment, the organoboron salt of cyanine dye and the ammonium salt of organoboron are used as the coloring composition. A molar ratio of the salts is set to 1:2 to prepare a hot-melt ink. If the proportion of the ammonium salt of organoboron becomes less than 67% in a molar ratio, for example, the molar ratio of the organoboron salt of cyanine dye and the ammonium salt of organoboron is 1:1, the decoloring efficiency by a near infrared emission is reduced. Further, it is unnecessary to increase the proportion of the ammonium salt of organoboron to more than 67% in a molar ratio, for example, a molar ratio of 1:3 because when the proportion of the ammonium salt of organoboron becomes more than 67% in a molar ratio, there is no additional effect on the decoloring of the organoboron salt of cyanine dye as it will be effectively decolored.

In this preferred embodiment, a wax, which is solid at ordinary temperatures, is used as the vehicle. The wax is selected from a natural wax or a synthetic wax having a melting point of 50° C. or higher. Only one kind of such a wax or a mixture of two or more kinds thereof can be used. Further, additives such as an antioxidant, a viscosity modifier and a tackiness agent may be added to the vehicle. In this preferred embodiment, stearone (Kao Wax T-1, m.p. 79° C.; manufactured by Kao K.K.)

was used. The composition of the hot-melt ink prepared in this preferred embodiment is shown below.

EXAMPLE 1

Kao Wax T-1 97 wt %
Organoboron salt of cyanine dye 1.52 wt %
Tetrabutylammonium butyltriphenyl borate 1.48 wt %

The hot-melt ink having the above composition was prepared by mixing the organoboron salt of cyanine dye and the tetrabutylammonium butyltriphenyl borate into the Kao Wax T-1 heated to a temperature not lower than the melting point by stirring. The hot-melt ink thus prepared is a solid at ordinary broad temperatures, and when it is heated to a temperature greater than the melting point, it becomes a liquid having a viscosity capable of being jetted by an ink jet device.

Figure 1:
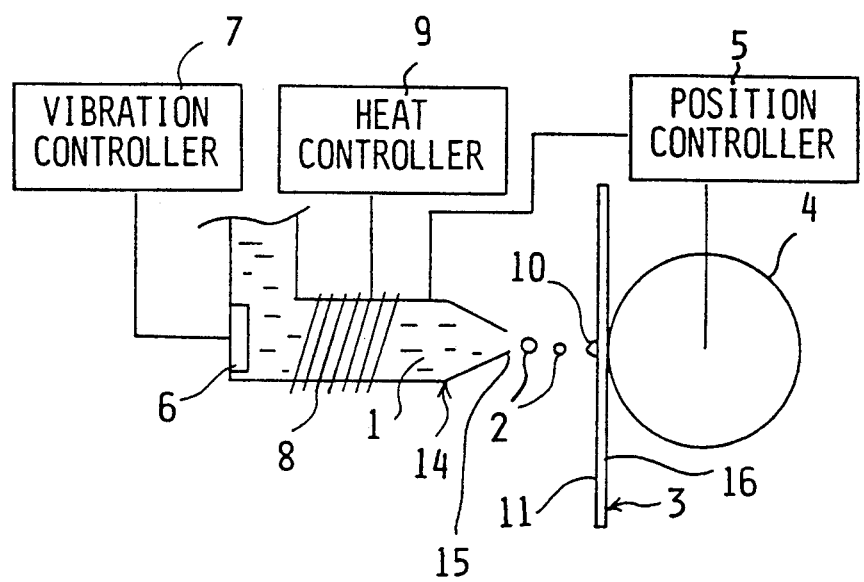
FIG. 1 is a schematic view showing a manner of ink jet recording with use of a hot-melt ink.

FIG. 1 shows a manner of ink jet recording using the hot-melt ink of the first preferred embodiment. An ink jet device 14 is generally maintained at a temperature greater than the melting point of the ink by the heat of a heater 8 connected to a heat controller 9 and controlled thereby. The hot-melt ink is heated and melted in the ink jet device 14 to become a molten ink 1 having a viscosity capable of being jetted. The molten ink 1 is jetted as liquid ink particles 2 from a nozzle 15 of the ink jet device 14 by pressure vibration of a piezoelectric element 6 connected to a vibration controller 7 and controlled thereby. A recording paper 3 is disposed between the ink jet device 14 and a platen 4 in such a manner that a recording surface 11 of the recording paper 3 is opposed to the nozzle 15 of the ink jet device 14 and a back surface 16 of the recording paper 3 is in contact with the platen 4. The liquid ink particles 2 jetted from the nozzle 15 reach the recording surface 11 of the recording paper 3, where they are cooled and solidify, to form a recorded image 10 on the recording surface 11. At this time, the relative positional relationship between the recording paper 3 and the ink jet device 14 is controlled by a position controller 5 connected to the platen 4 and the ink jet device 14. In association with this control, the vibration of the piezoelectric element 6 is controlled by the vibration controller 7 to effect printing of the recorded image 10 as characters or patterns.

Figure 3:
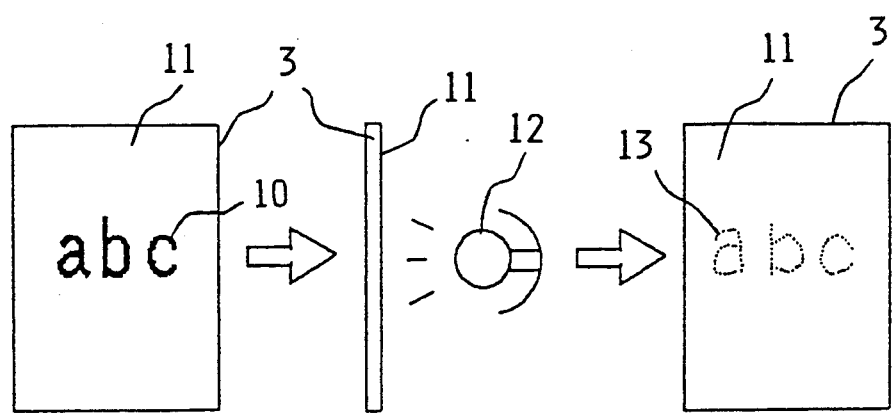
FIG. 3 is an illustration of a decoloring method.

FIG. 3 shows a method of decoloring the recorded image 10 obtained by the ink jet recording mentioned above. The recorded image 10 printed on the recording surface 11 of the recorded paper 3 is blue like a normal recorded image under general illumination light. However, when the recorded image 10 is irradiated by a near infrared light, or emissions, generated from a light source 12, the recorded image 10 absorbs light having a wavelength near 820 nm, and the cyanine dye, as the coloring matter contained in the recorded image 10, is decomposed by the light to lose its color. As a result, the recorded image 10 becomes a colorless or decolored image 13. In this manner, when a recorded image becomes unnecessary after printing, it may be decolored by a simple method, that is, by irradiation of near infrared light and the recording paper having the recorded image thus decolored may be reused. Accordingly, the amount of refuse in an office may be greatly reduced and an economically large effect may be attained.

Further, the degree of decoloring may be changed by controlling an intensity of the light from the light source 12. Accordingly, a color concentration of a recorded image may be reduced to a degree such that the recorded image cannot be copied, thereby differentiating the recorded image from other recorded images.

The invention is not limited to the above preferred embodiment, but various modifications may be made. For example, the coloring composition according to the present invention may be a combination of an organoboron salt of ordinary cationic dye with an ammonium salt of organoboron. Also in this case, a decoloring characteristic similar to that in the above preferred embodiment may be obtained, and the desired print color may be selected according to the kind of the dye to be used. Further, the cyanine dye or the cationic dye may be used singly, or a mixture of two or more kinds of these dyes may be used. Further, in addition to the previously described coloring composition, a general dye or pigment may be mixed therewith. In this case, after printing the hot-melt ink, the coloring composition only is decolored by irradiation of the near infrared light, so that the color of the recorded image after irradiation of the near infrared light is changed to that of the general dye or pigment. Accordingly, by locally irradiating the near infrared light, a recorded image obtained by printing in a single color may be converted into a multicolored image. Moreover, the ink according to the first embodiment can be used as an ink for a thermal transfer printer by coating the ink on a thermal print ink ribbon.

Further, the ink of the invention is not limited to the hot-melt ink as mentioned in the above preferred embodiment, but it may be a liquid ink having a viscosity capable of being jetted at ordinary temperatures. In this case, an aromatic solvent such as toluene or xylene is used as the vehicle. The organoboron salt of cyanine dye and the ammonium salt of organoboron of the coloring composition are dissolved in the aromatic solvent to develop a decoloring characteristic. The composition of such a liquid ink may be as follows:

EXAMPLE 2

Toluene 97 wt %
Organoboron salt of cyanine dye 1.52 wt %
Tetrabutylammonium butyltriphenyl borate 1.48 wt %

An ink jet recording method using the liquid ink of the second preferred embodiment is quite similar in principle to that of the hot-melt ink, illustrated in FIG. 1, except that heating is not required or used. Further, the decoloring method in the second preferred embodiment is the same as that shown in FIG. 3, and a decoloring effect and a color changing application are also similar to those obtained using the hot-melt ink.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An ink for a printer, comprising:
    a coloring composition comprising an organoboron salt of a cationic dye and an ammonium salt of organoboron that is capable of being one of decolored and changed in concentration of color by addition of external energy; and
    a vehicle for retaining the coloring composition.

2. The ink as defined in claim 1, wherein the vehicle is a solid at ordinary temperatures and becomes a liquid when the solid is heated to a temperature not lower than a melting point thereof.

3. The ink as defined in claim 1, wherein the vehicle is a liquid at ordinary temperatures.

4. The ink as defined in claim 1, wherein the external energy is light energy and the organoboron salt of the cationic dye is an organoboron salt of a cyanine dye.

5. The ink as defined in claim 2, wherein the external energy is light energy and the organoboron salt of the cationic dye is an organoboron salt of a cyanine dye.

6. The ink as defined in claim 3, wherein the external energy is light energy and the organoboron salt of the cationic dye is an organoboron salt of a cyanine dye.

7. The ink as defined in claim 4, wherein a molar ratio of the organoboron salt of cyanine dye and the ammonium salt of organoboron is set to 1:2.

8. The ink as defined in claim 2, wherein the vehicle is a wax having a melting point of 50° C. or higher.

9. The ink as defined in claim 8, wherein the wax is stearone.

10. The ink as defined in claim 4, wherein the ammonium salt of organoboron is tetrabutylammonium butyltriphenyl borate.

11. The ink as defined in claim 4, wherein the light energy is a near infrared emission.

12. The ink as defined in claim 3, wherein the vehicle is an aromatic solvent.

13. The ink as defined in claim 12, wherein the aromatic solvent is selected from a group consisting of toluene and xylene.

14. The ink as defined in claim 4, further comprising one of a dye and a pigment.

* * * * *